(12) United States Patent
Kitamura (10) Patent No.: US 9,020,694 B2
(45) Date of Patent: Apr. 28, 2015

(54) BICYCLE-USE MEASURING APPARATUS AND CONTROL METHOD

(75) Inventor: Satoshi Kitamura, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/587,848

(22) Filed: Aug. 16, 2012

(65) Prior Publication Data

US 2013/0054088 A1    Feb. 28, 2013

(30) Foreign Application Priority Data

Aug. 29, 2011   (JP) ................................. 2011-186587

(51) Int. Cl.
| | |
|---|---|
| G06F 7/00 | (2006.01) |
| B62M 9/00 | (2006.01) |
| F16H 29/04 | (2006.01) |
| H02K 7/10 | (2006.01) |
| H02K 11/00 | (2006.01) |
| G01L 3/26 | (2006.01) |
| G01P 3/487 | (2006.01) |

(52) U.S. Cl.
CPC .. *G01L 3/26* (2013.01); *G01P 3/487* (2013.01)

(58) Field of Classification Search
USPC .................... 701/36; 310/75 R, 68 A; 74/117
See application file for complete search history.

(56) References Cited

U.S. PATENT DOCUMENTS

| | | | |
|---|---|---|---|
| 5,031,455 A | 7/1991 | Cline | |
| 6,418,797 B1 * | 7/2002 | Ambrosina et al. ....... | 73/862.29 |
| 6,945,888 B2 * | 9/2005 | Fukuda et al. ................. | 474/70 |
| 7,042,123 B2 * | 5/2006 | Kitamura et al. ........... | 310/75 C |
| 7,257,468 B1 * | 8/2007 | Costa et al. ....................... | 701/1 |
| 7,342,321 B2 * | 3/2008 | Kitamura ..................... | 290/1 R |
| 7,491,154 B2 * | 2/2009 | Yonehana et al. .............. | 482/57 |
| 7,805,268 B2 * | 9/2010 | Takamoto ....................... | 702/85 |
| 7,948,141 B2 * | 5/2011 | Takeuchi ...................... | 310/191 |
| 8,025,597 B2 * | 9/2011 | Takamoto ....................... | 474/70 |
| 8,117,923 B2 | 2/2012 | Sasaki | |
| 8,336,400 B2 * | 12/2012 | Lassanske .................. | 73/862.29 |
| 2004/0114407 A1 * | 6/2004 | Kitamura et al. ............. | 363/125 |
| 2007/0296176 A1 * | 12/2007 | Watarai ......................... | 280/238 |
| 2011/0011192 A1 * | 1/2011 | Nagel ............................. | 74/117 |
| 2012/0082246 A1 * | 4/2012 | Su et al. ....................... | 375/259 |

FOREIGN PATENT DOCUMENTS

| | | |
|---|---|---|
| CN | 1836970 A | 9/2006 |
| CN | 101397042 A | 4/2009 |
| DE | 3150149 A1 | 6/1983 |
| DE | 100 12 458 A1 | 9/2001 |
| DE | 20 2006 008 279 U1 | 12/2006 |
| DE | 10 2007 013 884 A1 | 9/2008 |
| EP | 0393427 A2 | 10/1990 |
| JP | 2004314753 A * | 11/2004 ............. B62M 23/02 |

* cited by examiner

*Primary Examiner* — Thomas G Black
*Assistant Examiner* — Tyler Paige
(74) *Attorney, Agent, or Firm* — Global IP Counselors (57) ABSTRACT

A bicycle-use measuring apparatus includes a sensor and a controller. The sensor is configured to be installed on a bicycle having a rotating part. The controller is operatively connected to the sensor. The controller adjusts a detection frequency of the sensor in accordance with changes in a rotational state of the rotating part.

18 Claims, 6 Drawing Sheets

BICYCLE-USE MEASURING APPARATUS AND CONTROL METHOD

CROSS-REFERENCE TO RELATED APPLICATIONS

This application claims priority under 35 U.S.C. §119 to Japanese Patent Application No. 2011-186587, filed Aug. 29, 2011. The entire disclosure of Japanese Patent Application No. 2011-186587 is hereby incorporated herein by reference.

BACKGROUND

1. Field of the Invention

This invention generally relates to a bicycle-use measuring apparatus and a control method. More specifically, the present invention relates to a bicycle-use measuring apparatus for a sensor that measures a physical quantity that adjusts in response to changes in a riding state of a bicycle.

2. Background Information

A sensor generally uses a timer or the like to measure some kind of physical phenomenon once per prescribed time interval. The same is true regarding an apparatus that measures the force acting on a part of a bicycle.

SUMMARY

When a sensor is used to measure the force acting on a component part of a bicycle once per prescribed time interval, it is necessary to set the measurement interval to be as short as possible in order to obtain a sufficient measurement accuracy during any kind of riding state. Consequently, depending on the riding state, electric power may be consumed undesirably due to executing excessive measurements. Therefore, an object of the present invention is to provide a control apparatus and control method that can suppress an electric power consumption amount while controlling a sensor that measures a physical quantity that changes in response to a riding state of a bicycle such that a sufficient measurement accuracy is obtained.

For achieving the aforementioned object, a bicycle-use measuring apparatus is provided that basically comprises a sensor and a controller. The sensor is configured to be installed on a bicycle having a rotating part. The controller is operatively connected to the sensor. The controller adjusts a detection frequency of the sensor in accordance with changes in a rotational state of the rotating part. The aforementioned object is also achieved by a control method that basically comprises providing a sensor on a bicycle having a rotating part, and adjusting a detection frequency of the sensor in accordance with changes in a rotational state of the rotating part.

With the present invention, it is possible to realize a bicycle-use measuring apparatus and control method that can suppress an electric power consumption amount while controlling a sensor that measures a physical quantity that changes in response to a riding state of a bicycle such that sufficient measurement accuracy is obtained.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
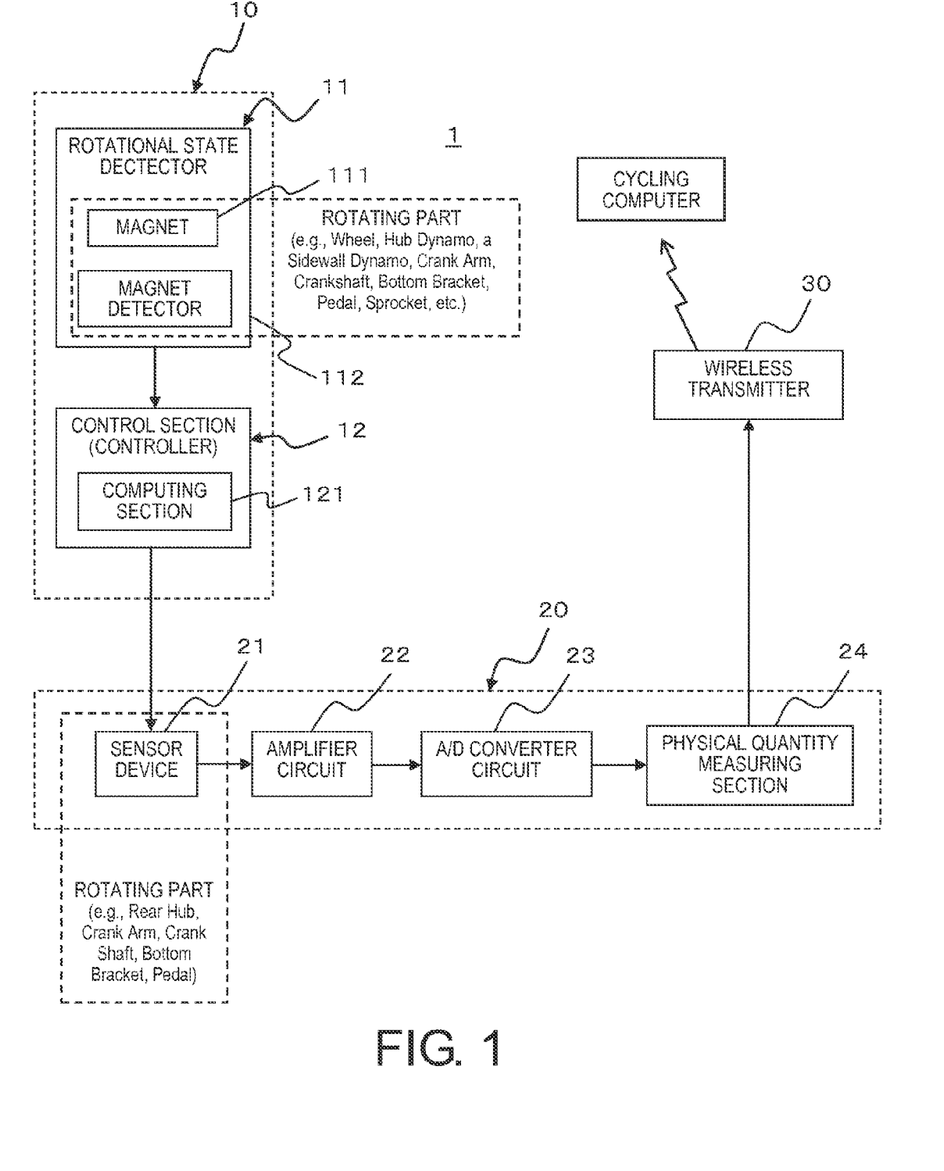
FIG. 1 is a block diagram showing a schematic configuration of bicycle-use measuring apparatus according to a first embodiment.

A bicycle-use measuring apparatus 1 according to a first embodiment of the present invention will now be explained. The bicycle-use measuring apparatus according to the first embodiment can be installed on both normal bicycles that advance when a rider pedals and stationary bicycles such as exercise bicycles. FIG. 1 is a block diagram showing a schematic configuration of a bicycle-use measuring apparatus according to this embodiment. The bicycle-use measuring apparatus 1 comprises a sensor signal control apparatus 10, a sensor 20 and a wireless transmitter 30. The sensor signal control apparatus 10 comprises a rotational state detector 11 and a control section 12 (i.e., a controller). The sensor 20 comprises a sensor device 21, an amplifier circuit 22, an A/D converter circuit 23, and a physical quantity measuring section 24.

The control apparatus 10 adjusts a detection frequency of the sensor 20 installed on a bicycle in response to changes a rotational state of a rotating part of the bicycle. Examples of the rotating part include a wheel, a crank, a hub, a sprocket, a pulley and a pedal. The crank includes a crankshaft and a pair of crank arms provided on both ends of the crankshaft.

The sensor 20 measures a physical quantity that changes in response to a riding state of the bicycle based on a detection frequency changed by the control device 10. The physical quantity is typically the torque acting on the rotating part or a power (work rate) required to rotate the rotating part. The sensor 20 can be mounted on the same rotating part as the rotational state detector 11 if needed and/or desired. However, quantities as a chain tension, a pedal depression force, and a twisting or sagging of a handlebar or a frame are also included in the concept of the physical quantity. Thus, the sensor 20 is a preferably torque measurement sensor or a rider power, measurement sensor, which can more broadly be considered a rider force measurement sensor.

The wireless transmitter 30 transmits data related to the physical quantity measured by the sensor 20 to a cycling computer.

The rotational state detector 11 is realized with, for example, a dynamo or a magnetic sensor of a speedometer. The rotational state detector 11 includes a magnet 111 and a magnet detector 112. The rotational state detector 11 will be explained in more detail later.

The control section 12 is preferably a controller that adjusts the detection frequency of the sensor 20 in response to a detection result of the rotational state detector 11. Thus, the control section 12 (the controller) adjusts a detection frequency of the sensor 20 in accordance with changes in a rotational state of the rotating part as detected by the rotational state detector 11. The control section 12 provides electrical power to the sensor 20 when a detection will be executed by the sensor 20. In some cases, the control section 12 will include a computing section (processor) to calculate the detection frequency of the sensor 20. The control section 12 will be explained in more detail later.

The sensor device 21 is installed on a part that is a portion of the bicycle and subjected to a force applied by a rider. Parts that are subjected to a force applied by a rider include, for example, a crank arm, a crankshaft, a pedal, a bottom bracket, a frame, a handlebar, and a saddle. Although the sensor device 21 is a typical strain gauge, it is acceptable for the sensor device 21 to be a magnetostrictive element, a displacement sensor, or a pressure sensor that utilizes a fluid. The sensor device 21 activates due to electric power supplied by the control section 12 and measures a force exerted on the part by a rider.

The amplifier circuit 22 amplifies an analog electric signal outputted from the sensor device 21. The A/D converter circuit 23 converts the amplified analog electric signal to a digital signal. Based on the digital signal, the physical quantity measuring section 24 calculates the physical quantity that changes in response to the riding state of the bicycle. For example, it is acceptable for the sensor device 21 to be installed on a rear hub and for the physical quantity measuring section 24 to calculate the torque acting on the rear hub based on an output from the sensor device 21. It is also acceptable for the sensor device 21 to be installed on a crank arm or the crankshaft and for the physical quantity measuring section 24 to calculate the torque acting on the crankshaft based on an output from the sensor device 21. It is also acceptable for the sensor 20 to be installed on the bottom bracket and for the physical quantity calculating section 24 to calculate a chain tension based on an output from the sensor 20. It is also acceptable for the sensor device 21 to be installed on a pedal and for the physical quantity measuring section 24 to calculate the force acting on the pedal based on an output from the sensor device 21. Furthermore, it is acceptable for the physical quantity calculating section 24 to calculate a pedaling power of the rider pedaling the bicycle and an output power of a rear wheel based on the aforementioned torque, chain tension, or force calculated based on the output of the sensor 20.

Figure 2:
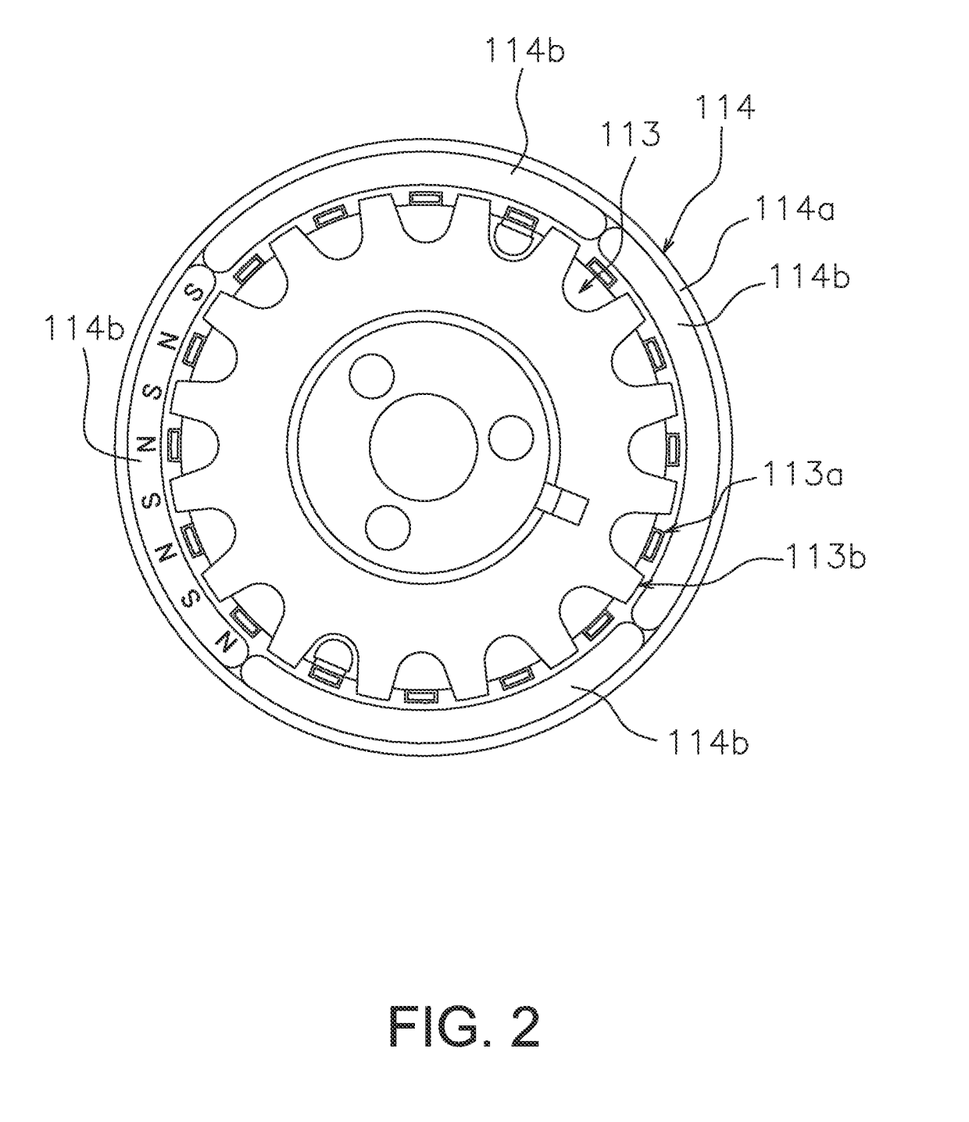
FIG. 2 shows an example of a rotational state detector or rotational state detector realized with a dynamo.

FIG. 2 is an example of a rotational state detector 11 realized with a hub dynamo that includes a stator 113 and a rotor 114. The dynamo is a dynamo installed on a rotary shaft of a rotating part, such as a hub dynamo. FIG. 2 is a cross sectional view of the dynamo as seen from a rotational axis direction.

The stator 113 having an electricity generating coil inside is provided in a central portion of the dynamo. The stator 113 corresponds to the magnet detector 112 shown in FIG. 1. The stator 113 has a plurality of pairs of magnetic pole pieces 113a and 113b arranged around a rotational axis. Each of the magnetic pole pieces 113a is configured to fit in-between two adjacent magnetic pole pieces 113b and the magnetic pole pieces 113a and the magnetic pole pieces 113b are arranged alternately along a circumferential direction around the rotational axis.

The rotor 114 is provided on an outside of the stator 113. The rotor 114 comprises an annular yoke 114a and four magnets 114b that are affixed to an internal circumferential surface of the yoke 114a. The magnets 114b correspond to the magnet 111 shown in FIG. 1. FIG. 2, four of magnets 114b are affixed, but it is acceptable for a different number of magnets 114b to be affixed depending on the dynamo. The magnets 114b each have N poles and S poles arranged alternately along a circumferential direction. FIG. 2 shows an example in which each of the magnets has a total of eight N poles and S poles such that 32 poles are arranged around one circumference of the rotor. The number of poles around one circumference of the rotor 1 is not limited to 32 poles. However, it is necessary to provide a number of poles that is sufficient for the control section 12 to obtain an adequate detection timing with the sensor 20.

Figure 3A:
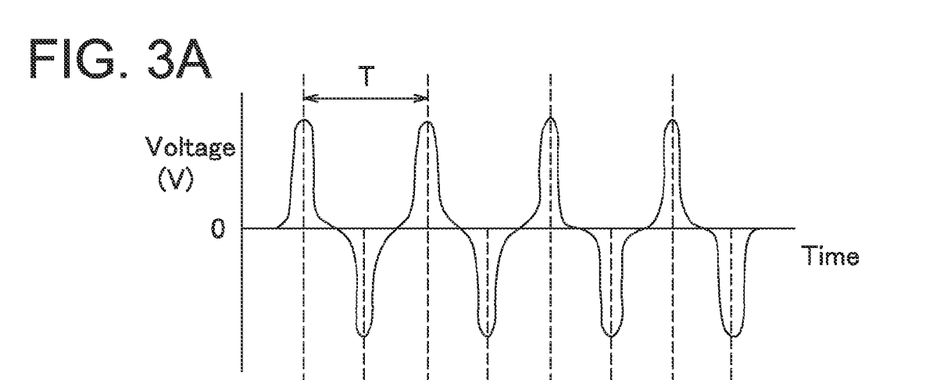
FIGS. 3A to 3C shows examples of an alternating-current voltage generated when the rotating part on which the dynamo is attached rotates and a voltage obtained when that alternating-current voltage is processed.

FIG. 3 shows examples of an alternating-current voltage generated when the rotating part on which the dynamo shown in FIG. 2 is attached rotates and a voltage obtained when that alternating-current voltage is processed. FIG. 3A is an example of an alternating-current voltage generated by the dynamo. This voltage is generated each time a relative position of the magnetic pole pieces 113a or 113b move from positions facing the N poles of the magnets 114b to positions facing the S poles or from positions facing the S poles to positions facing the N poles. Thus, one period T of the alternating-current voltage, as shown in FIG. 3A, is a duration during which the magnetic pole pieces 113a or 113b move from positions facing the N poles of the magnets 114b to positions facing the S poles and then move to positions facing the N poles (or move from positions facing the S poles to positions facing the N poles and then move to positions facing the S poles).

Figure 3B:
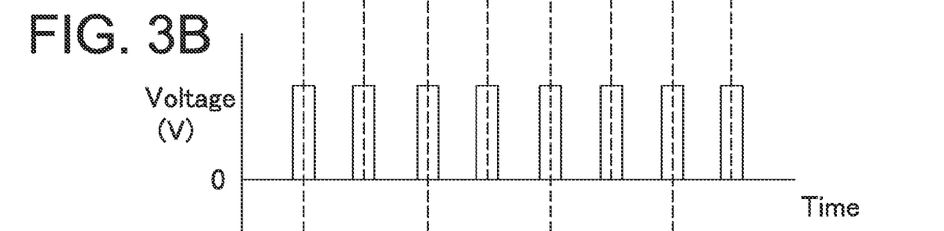

FIG. 3B shows an example of a voltage obtained when the alternating-current voltage of FIG. 3A is processed by passing it through a waveform shaping circuit. By processing the voltage in this way, an output signal is obtained which comprises one pulse wave per half period of the alternating-current voltage. In other words, each pulse of the output signal indicates that the magnetic pole pieces 113a and 113b have moved to a position facing a different pole, i.e., that the rotary shaft of the rotating part has rotated by an angle equal to 360 degrees divided by the number of poles existing along one circumference of the rotor.

Figure 3C:
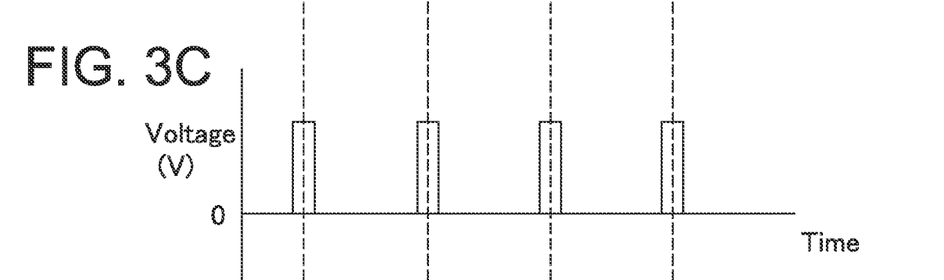

FIG. 3C shows an example of a voltage obtained when the alternating-current voltage of FIG. 3A is processed by passing it through a half-wave rectifier circuit and a waveform shaping circuit. By processing the voltage in this way, an output signal is obtained which comprises one pulse wave per one period of the alternating-current voltage. In other words, each pulse of the output signal indicates that the magnetic pole pieces 113a and 113b have moved to a position facing a different pole and then to position facing the same pole again, i.e., that the rotary shaft of the rotating part has rotated by an angle equal to 360 degrees divided by the number of S poles existing along one circumference of the rotor or the number of N poles existing along one circumference of the rotor.

Based on this pulse, the control section 12 activates the sensor device 21 at the detection timing of the sensor 20. For example, if detection timing of the sensor 20 occurs when the rotary shaft of the rotating part rotates by an angle of 360 degrees divided by N (where N is the number of poles around one circumference of the rotor), then the control section 12 activates the sensor device 21 at a timing corresponding to when a pulse wave shown in FIG. 3B is generated. The control section 12 stops detection by the sensor device 21 after the sensor device 21 has been activated for a prescribed amount of time. The prescribed amount of time is selected to be shorter than the interval between the current pulse and a next adjacent pulse. A "timing corresponding to when a pulse wave is generated" means either a timing corresponding to a leading edge or a timing corresponding to a trailing edge of a pulse. In this case, the waveform shaping circuit that produces the signal shown in FIG. 3B corresponds to the control section 12. Also, if the detection timing of the sensor 20 occurs when the rotary shaft of the rotating part rotates by an angle of 360 degrees divided by M (where M is the number of S poles around one circumference of the rotor or the number of N poles around one circumference of the rotor), then the control section 12 activates the sensor device 21 at a timing corresponding to when a pulse wave shown in FIG. 3B is generated. In this case, the half-wave rectifier circuit and the waveform shaping circuit that produce the signal shown in FIG. 3C correspond to the control section 12.

Furthermore, if the detection timing of the sensor 20 occurs when the rotary shaft of the rotating part rotates by an angle of 360 degrees divided by N (where N is the number of poles around one circumference of the rotor) and multiplied by K (where K is an integer), i.e., an angle different from an angle where a pulse of FIG. 3B is outputted, then it is good for the control section 12 to be provided with a counter that measures a number of pulses in addition to the waveform shaping circuit that produces the signal shown in FIG. 3B. In such a case, the counter corresponds to the computing section 121 of FIG. 1. If the counter value reaches a prescribed value (e.g., the aforementioned K), then control section 120 issues a pulse wave serving as a trigger signal to the sensor device 21.

It is also acceptable to use the aforementioned pulse wave as a trigger signal for activating the sensor device 21. In this case, the sensor 20 includes a sensor device drive section that receives the trigger signal and actuates the sensor device 21.

The aforementioned pulse wave can also be used as an actuation voltage for the sensor device 21. In such a case, the pulse voltage is fed to the sensor 20 as an actuation voltage for the sensor device 21. When the pulse voltage is used as the actuation voltage for the sensor device 21, the control section 12 should be equipped with a voltage limiting circuit to prevent the pulse voltage from fluctuating due to changes of the rotational speed of the dynamo.

Figure 4:
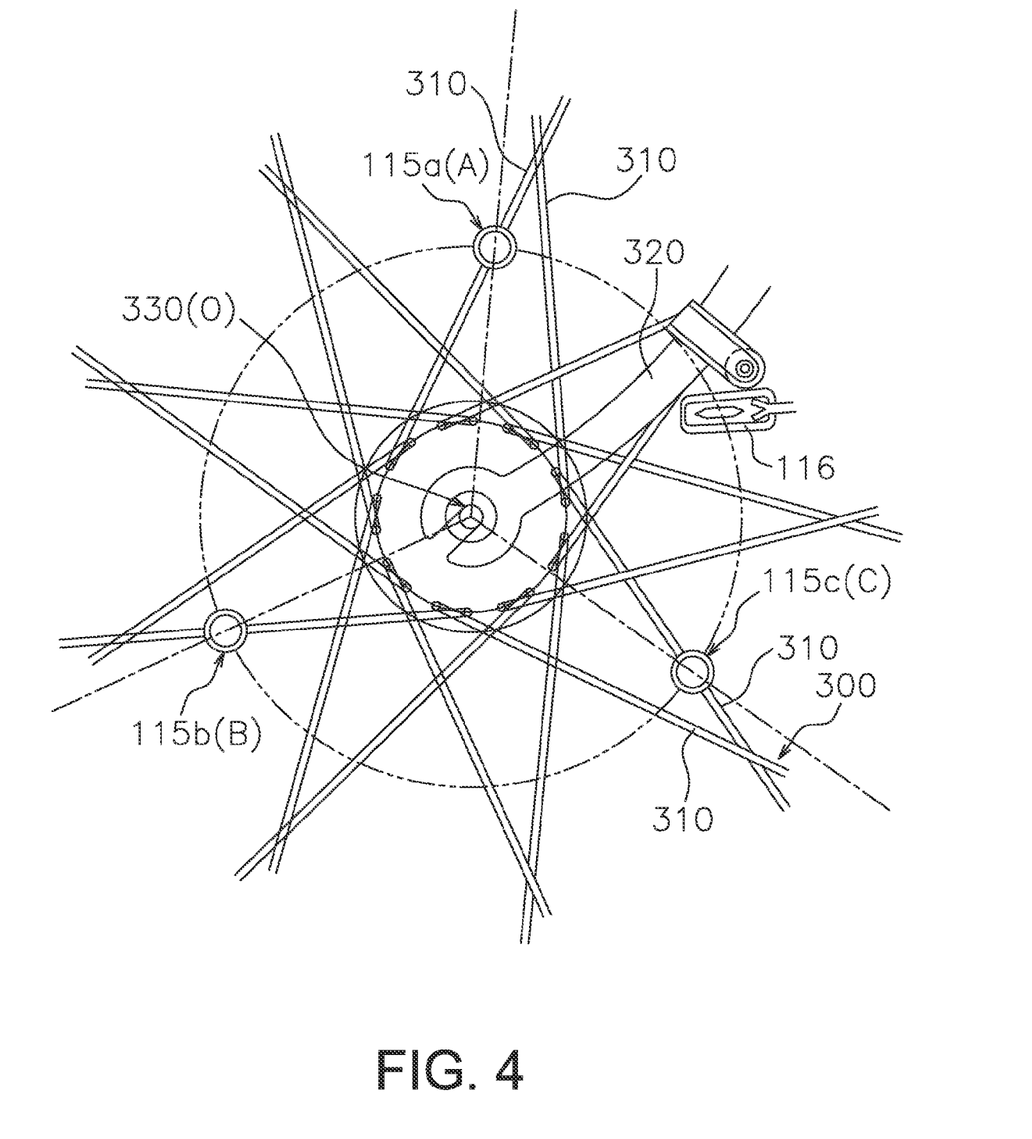
FIG. 4 shows an example of a rotational state detector or rotational state detector realized with a magnetic sensor of a speedometer.

A case in which the rotational state detector 11 is realized with a magnetic sensor of a speedometer will now be explained. FIG. 4 shows an example of a rotational state detector realized with a magnetic sensor of a speedometer. In this rotational state detector, magnets 115a to 115c are attached to spokes 310 of a wheel 300 and a reed switch 116 is attached to a fork 320 of the bicycle. The magnets 115a to 115c correspond to the magnet shown in FIG. 1 and the reed switch 116 corresponds to the magnet detector 112 shown in FIG. 1. Each time the magnets 115a to 115c pass in front of the reed switch 116 as the wheel rotates, the reed switch 116 turns on and off and this on-off signal is outputted as an output of the rotational state detector 11. The magnets 115a to 115c can be arranged in any manner so long as the number of magnets required to detect the detection timing of the sensor 20 of the control section 12 are provided. FIG. 4 is shows an arrangement of magnets for a case in which the detection timing of the sensor 20 occurs each time the wheel rotates 120 degrees. In FIG. 3, a rotational center 330 of the wheel is at a point O and the magnets 115a to 115c are arranged such that the angles ∠AOB=∠BOC=∠COA=120 degrees form, where points A to C correspond to the centers of the magnets 115a to 115c.

In the case shown in FIG. 4, the control section 12 is provided with a waveform shaping circuit that shapes the pulse wave of the on-off signal received from the reed switch. The control section 12 activates the sensor device 21 for a prescribed amount of time based on the shaped on-off signal.

It is acceptable to use this shaped pulse signal in the same manner as the shaped pulse signal of the dynamo explained previously. If the magnets 115a to 115c are arranged such that a higher angle resolution can be measured than the angle resolution that is necessary to measure the detection timing of the sensor 20, then it is acceptable for the control section 12 to be equipped with a counter serving as a computing section 121 and configured such that a pulse wave is outputted when a prescribed timing occurs.

Figure 5:
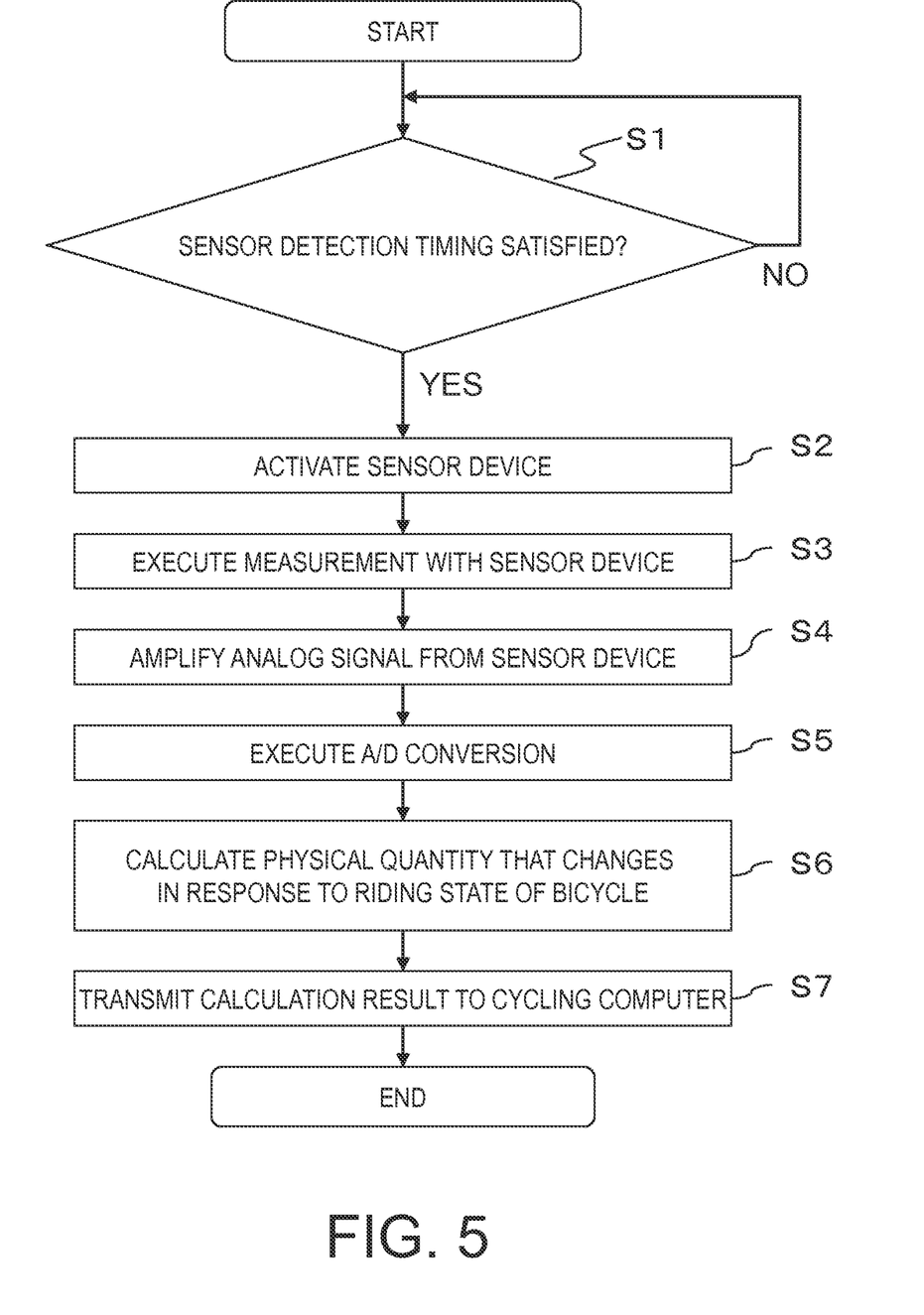
FIG. 5 is a flowchart of a process executed by a bicycle-use measuring apparatus according to the first embodiment.

Next, the process steps of a measurement method used with the bicycle sensor of this embodiment will be explained. FIG. 5 is a flowchart showing the process steps of the measurement method used with the bicycle sensor of this embodiment.

First, the control section 12 determines if the detection timing of the sensor 20 has occurred (step S1). If the detection timing of the sensor 20 has not occurred (No in step S1), then the control section 100 waits until that timing occurs (step S1). The timing is determined as explained previously by processing the output signal of the rotational state detector 11 with a waveform shaping circuit or the like.

When the control section 12 determines that the detection timing of the sensor 20 has occurred (Yes in step S1), then the control section 12 activates the sensor device 21 (step S2) in step S2, instead of activating the sensor device 21, it is also acceptable for the control section 12 to transmit a trigger signal for the sensor device to acquire data. This is accomplished by the control section 12 sending a pulse wave to the sensor device 21.

The sensor device 21 then measures the force acting on a bicycle part, the frame, or other portion on which the sensor device is installed based on a strain amount or other quantity (step S3). The sensor device 21 outputs the measurement result as an analog electric signal. That is, the sensor device 21 outputs an electric signal corresponding to a strain amount of the portion where it is attached.

The amplifier circuit 22 amplifies the analog electric signal to an appropriate range for executing an A/D conversion process (step S4). The A/D converter circuit 23 converts the amplified analog electric signal to a digital signal (step S5).

Based on the digital signal, the physical quantity measuring section 24 calculates the physical quantity that changes in response to the riding state of the bicycle (step S6). Typically, the physical quantity calculating section 24 calculates a pedal depression force, a chain tension, or a torque acting on a rotating part such as a rear hub, a rear wheel, or a crankshaft based on the output from the sensor device 21, which is installed on a pedal, a bottom bracket, a rear hub, or a crank. The physical quantity calculating section 24 then calculates a power that the bicycle outputs and/or a power that the rider outputs using a predetermined computational formula and information related to the pedal depression force, the chain tension, or the torque acting on a rotating part such as a rear hub, a rear wheel, or a crankshaft.

For example, the power exerted by the rider to pedal the bicycle can be calculated using the equation (1) shown below based on the torque acting on the crankshaft and a cadence (crank rotational speed) detected by the rotational state detector 11.

$$\text{Power(W)} = \text{Torque(N·m)} \times \text{Cadence(rpm)} \times 2\pi/60 \quad (1)$$

Also, for example, the physical quantity calculating section 24 can calculate a power that the bicycle outputs based on the torque acting on the rear wheel and the rotational speed of the rear wheel.

If the rotational state detector 11 is installed on the crankshaft, then the cadence is the rotational speed detected by the rotational state detector 11. However, if the rotational state detector 11 is installed on the rear wheel, then the physical quantity rotational state detector 24 estimates the rotational speed of the crank based on a gear ratio the rotational speed detected by the rotational state detector 11 and calculates the power based on the estimated rotational speed.

It is also acceptable for the physical quantity calculating section 24 to calculate a different physical quantity based on an output signal of a sensor device 21 installed on a part other than those cited above. Examples of other physical quantities include chain tension, pedal depression force, twisting or sagging of the handlebar or frame.

Afterwards, wireless transmitter 30 transmits the calculation result calculated by the physical quantity calculating section 24 to the cycling computer (S7).

The effects of this first embodiment will now be explained. The bicycle-use measuring apparatus according to this embodiment does not execute unnecessary detections because it can change a detection frequency of the sensor in response to a rotational state of the rotating part. Thus, a sufficient measurement frequency can be obtained while suppressing the electric power consumption amount.

Additionally, since this bicycle-use measuring apparatus measures a physical quantity that changes in response to a riding state of the bicycle when a rotation amount of a rotating part becomes a prescribed value, the physical quantity can be always be measured when the rotating part is in a prescribed phase (i.e., a prescribed rotational angle relative to a prescribed reference angle such as a 0° position). Also, this bicycle-use measuring apparatus can execute a fixed number of detections per single rotation if a wheel or single rotation of the crank regardless of the rotational speed of the wheel or the crank. As a result, the measurement accuracy is stabilized. Even if the bicycle advances at a low speed, the number of detections does not increase and, thus, the electric power consumption can be reduced.

Although two examples of a rotational state detector have been explained, one in which a dynamo is used and one in which a magnetic sensor of a speedometer is used, the magnetic sensor of a speedometer incurs a measurement delay while the detection section using a dynamo does not incur a measurement delay. Therefore, the detection section that uses a dynamo can achieve a higher measurement accuracy than the detection section that uses a magnetic sensor of a speedometer.

Figure 6:
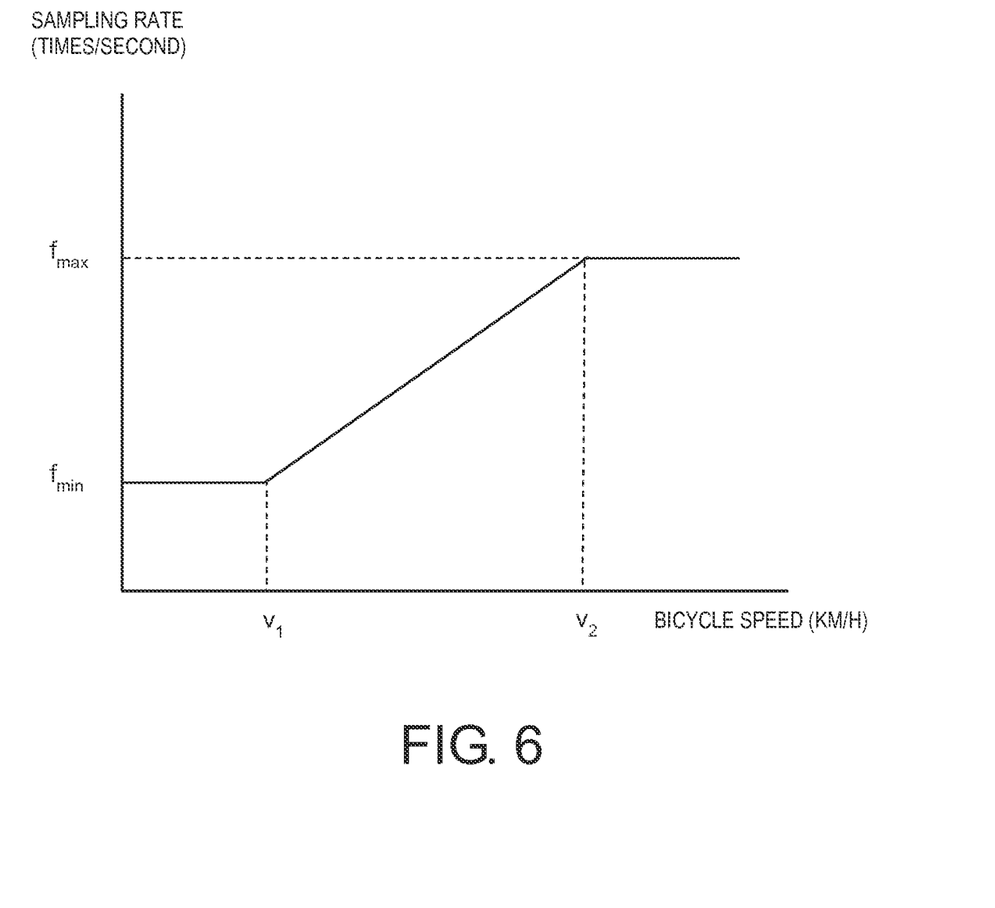
FIG. 6 is a diagram expressing a relationship between vehicle speed and sampling rate for a case in which a control section adjusts a sampling rate of a sensor in response to vehicle speed.

The method by which the control section determines the detection timing of the sensor 20 is not limited to the method explained previously. For example, it is acceptable for the rotational state detector 11 to be a cycling computer that detects a bicycle speed and for the control section 12 to receive the bicycle speed outputted from the rotational state detector and determine a sampling rate based on the bicycle speed as shown in FIG. 6. The control section 12 would then activate the sensor for a prescribed amount of time in accordance with the determined sampling rate. The method of determining the sampling rate shown in FIG. 6, in which the sampling rate increases from $f_{min}$ to $f_{max}$ ($f_{min} < f_{max}$) proportionally to the vehicle speed between the bicycle speeds $v_1$ and $v_2$ ($v_1 < v_2$), is merely an example. For example, it is acceptable for the bicycle speed $v_1$ to be zero and the bicycle speed $v_2$ to be infinity. Any method can be used so long as the sampling rate increases as the bicycles speed becomes faster.

The method used by the control apparatus 10 to detect the rotation amount of the rotating part of the bicycle is not limited to that presented in the previously explained embodiment. For example, it is acceptable to use a rotary encoder or another different device as the rotational state detector 11.

Also, although FIG. 2 shows a dynamo, such as a hub dynamo, configured to be installed on the rotary shaft of the rotating part, instead, it is acceptable to use a sidewall dynamo (bottle dynamo) that contacts a side of the tire. Furthermore, although the rotational state detector shown 11 in FIG. 4 is installed on a wheel, it is acceptable for to be installed on the crank.

The internal structure of the sensor 20 is not necessarily limited to that presented in the previously explained embodiment. For example, if the sensor device 21 is configured to output a digital signal, then it is acceptable to omit the amplifier circuit 22 and the A/D converter circuit 23. Also, if data related to the physical quantity measured by the sensor 20 is transmitted to the cycling computer through a wire, then it is acceptable to omit the wireless transmitter 30.

It is also acceptable for the sensor 20 to comprise solely the sensor device 21, and for the amplifier circuit 22, the A/D converter circuit 23, the physical quantity calculating section 24 to be provided in the control section 12. It is also acceptable for the physical quantity calculating section 24 to be provided in the cycling computer; in such a case, information expression the output of the sensor device 21 is outputted from the sensor 20.

Although embodiment is configured such that the control section 12 activates the sensor device 21 for a prescribed amount of time at the detection timing, it is also acceptable tier the sensor device 21 to be normally activated and for the output value of the sensor device 21 to be acquired through the physical quantity calculating section 24 and the control section 121 when the detection timing occurs. If a physical quantity calculating section is not provided, then it is acceptable to acquire the output value through a wireless circuit or other method.

It is also acceptable for the control apparatus 10 not to have a physical quantity calculating section 24, to be provided with a storage section that simply stores information outputted from the A/D converter circuit 23, and to be configured to read information stored in the storage section either wirelessly or with a hard connection.

Although the computing section 121 and the physical quantity calculating section 24 are realized with a typical microcomputer in the embodiment, it is acceptable for them to be realized with a CPU (central processing unit) interpreting and executing executable program data that have been stored in a storage device (ROM, RAM, etc.) and can be executed in the order of the previously explained process. It is also acceptable for the A/D converter circuit 23, the physical quantity calculating section 24, and the control section 121 to be realized together with a single microcomputer. Instead of a simple pulse wave, it is acceptable for the signal transmitted from the control section 12 to the sensor device 21 to have any form so long as it can be used as a trigger signal or used to supply electric power to the sensor device 21.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so tong as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle-use measuring apparatus comprising:
   a sensor configured to be installed on a bicycle having a rotating part;
   a rotational state detector that detects the rotational state of the rotating part; and
   a controller operatively connected to the sensor and the rotational state detector, the controller adjusting a detection frequency of the sensor in accordance with changes in a rotational state of the rotating part during a riding state, and in response to a detection result of the rotational state detector.

2. The bicycle-use measuring apparatus as recited in claim 1, wherein
   the rotational state detector detects rotation of the rotating part, which includes one of a wheel, a crank, a hub, a sprocket, a pulley and a pedal.

3. The bicycle-use measuring apparatus as recited in claim 1, wherein
   the sensor detects a physical quantity that changes in response to a change in a riding state of the bicycle.

4. The bicycle-use measuring apparatus as recited in claim 1, wherein
   the rotational state detector comprises a dynamo.

5. The bicycle-use apparatus as recited its claim 4, wherein the dynamo is a hub dynamo or a sidewall dynamo.

6. The bicycle-use measuring apparatus as recited in claim 4, wherein
   the controller changes the detection frequency of the sensor based on an alternating-current voltage generated by the dynamo.

7. The bicycle-use measuring apparatus as recited in claim 1, wherein
   the controller supplies electric power to the sensor when a detection is executed at the sensor.

8. The bicycle-use measuring apparatus as recited in claim 1, wherein
   the rotational state detector detects a rotational speed of a wheel of the bicycle or a rotational speed of a crank or a pedal.

9. The bicycle-use measuring apparatus as recited in claim 1, wherein
   the rotational state detector includes a magnet and a magnet detector that detects the magnet.

10. The bicycle-use measuring apparatus as recited in claim 9, wherein
    the controller has a computing section that computes the detection frequency based on a detection result of the magnet detector.

11. The bicycle-use measuring apparatus as recited in claim 3, wherein
    the sensor detects either a torque acting on the rotating part or a power exerted to rotate the rotating part as the physical quantity.

12. A control method comprising:
    providing a sensor on a bicycle having a rotating part;
    detecting a rotational state of the rotating part with a rotational state detector; and
    adjusting a detection frequency of the sensor with a controller in accordance with changes in a rotational state of the rotating part during a riding state and in response to a detection result of the rotational state detector.

13. The control method as recited in claim 12, wherein
    the adjusting includes changing the detection frequency of the sensor based on an alternating-current voltage generated by a dynamo in response to a rotational state of the rotating part.

14. The control method as recited in claim 12, wherein
    the adjusting includes supplying electric power to the sensor when a detection is executed at the sensor.

15. The control method as recited in claim 12, wherein
    the detecting of the rotational state includes detecting a rotational speed of a wheel of the bicycle or a rotational speed of a crank or a pedal.

16. The control method as recited in claim 12, wherein
    the detecting of the rotational state includes operating a magnet detector to detect a magnet.

17. The control method as recited in claim 16, further comprising
    computing the detection frequency based on a detection result of the detecting.

18. The control method as recited in claim 12, further comprising
    operating the sensor to detect either a torque acting on the rotating part or a power exerted to rotate the rotating part as a physical quantity that changes in response to a change in a riding state of the bicycle.

* * * * *